United States Patent
Hait et al.

(12)

(10) Patent No.: US 6,365,702 B1
(45) Date of Patent: Apr. 2, 2002

(54) POLYESTERCARBONATES AND METHODS FOR THE DIRECT INCORPORATION OF ACIDS INTO POLYCARBONATE CHAINS BY SSP

(75) Inventors: Sukhendu Bikash Hait, Tuscaloosa, AL (US); Mohan Mark Amaratunga, Clifton Park; David Paul Mobley, Niskayuna, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,747

(22) Filed: May 31, 2001

(51) Int. Cl.[7] ............................................... C08G 64/00

(52) U.S. Cl. ....................................... 528/196; 528/198

(58) Field of Search ................................... 528/196, 198

(56) References Cited

U.S. PATENT DOCUMENTS

| 4,948,871 A | 8/1990 | Fukuoka et al. ............. 528/481 |
| 5,204,377 A | 4/1993 | Fukawa et al. ................ 521/60 |
| 5,214,073 A | 5/1993 | Fukawa et al. ................ 521/60 |
| 5,717,056 A | 2/1998 | Varadarajan et al. ........ 528/196 |
| 6,060,576 A | 5/2000 | Wisnudel et al. ........... 528/196 |

FOREIGN PATENT DOCUMENTS

WO            14453 A1    3/2001

*Primary Examiner*—Terressa M. Boykin
(74) *Attorney, Agent, or Firm*—Andrew J. Caruso; Noreen C. Johnson

(57) ABSTRACT

A method for preparing a polyestercarbonate copolymer using solid state polymerization and polyestercarbonates prepared thereby is described. The method comprises preparing a mixture comprising partially crystalline bisphenol A polycarbonate oligomer and hydroxy acids, aliphatic diacids, cycloaliphatic diacids, aromatic diacids or aromatic triacids and subjecting that mixture to solid state polymerization to afford a polyestercarbonate copolymer.

16 Claims, No Drawings

POLYESTERCARBONATES AND METHODS FOR THE DIRECT INCORPORATION OF ACIDS INTO POLYCARBONATE CHAINS BY SSP

BACKGROUND OF THE INVENTION

The present invention describes improved polyestercarbonates and methods for their synthesis that involves the incorporation of structural units derived from carboxylic acids and their derivatives into polycarbonate chains under solid state polymerization (SSP) conditions. These acids include branched diacids, diacid soft blocks, and p-hydroxybenzoic acid (PHB), preferably, phenyl p-hydroxybenzoate. The present invention also preferably employs a catalyst, $Sb_2O_3$, and diphenyl carbonate in the production of the improved polyestercarbonates. Using the method of the present invention aromatic triacids such as the trisphenyl ester of 1,3,5-benzenetricarboxylic acid, a branching agent, may also be incorporated into these precursors before subjecting the precursor to SSP to produce branched polycarbonates. Following SSP, the resulting polyestercarbonates exhibit superior physical characteristics such as improved flow or enhanced melt strength, and modified Tg in comparison to analogous polycarbonate compositions lacking ester linkages.

Traditionally, two techniques were utilized in the production of polyestercarbonates: interfacial polycondensation processes and melt phase carbonate interchange reactions. Interfacial polycondensation routes to polyestercarbonates involve contacting a bisphenol and a diacid or diacid chloride with phosgene in a mixed aqueous-organic solution. An acid acceptor and optionally a catalytic amine are also present.

Interfacial polycondensation processes suffer several disadvantages. First, toxic and hazardous phosgene is utilized in these reactions. Also, the interfacial polycondensation process employs a chlorinated hydrocarbon, such as methylene chloride, as the organic solvent which requires substantial and costly environmental management to prevent unintended solvent emissions. Furthermore, the product polyestercarbonate contains residual sodium and chloride ions which adversely affect the hydrolytic stability of the product.

Methods for the preparation of polyestercarbonates through melt phase carbonate interchange reactions are also known. In a typical melt phase process, a bisphenol and a diacid or diester is contacted with a diaryl carbonate in the melt in the presence of a suitable catalyst. An oligomeric polyestercarbonate is produced, usually with a weight average molecular weight in the range of 2,000–10,000 daltons as determined by gel permeation chromatography, which may be relative to polycarbonate or polystyrene standards. The oligomer generally has an intrinsic viscosity between 0.06 and 0.30 dl/g as determined in chloroform at 25° C. The oligomer is then converted to a high molecular weight polyestercarbonate by increasing the polymerization temperature.

Melt phase processes also suffer from a number of disadvantages. For example, at very high conversions (>98%), the melt viscosity increases considerably. Handling of high viscosity melt polymerization mixtures at high temperature is difficult. There is an increased chance of poor mixing and generating hot spots, which lead to the loss of product quality. In addition, this route requires specially designed equipment such as a Helicone mixer operating at temperatures in the range of 270–300° C. Polyestercarbonates are susceptible to degradation at high temperature to a greater extent than are homopolycarbonates.

More recently, SSP has been used as an alternative process for the preparation of high molecular weight polycarbonates. SSP utilizes substantially lower temperatures than the melt process. Typically SSP is carried out in a range between about 180 and about 230° C. The SSP process does not require handling molten polymer (melt) at high temperatures and the equipment needed to perform the reaction is very simple. In a typical solid state polycondensation process, a suitable polycarbonate oligomer is subjected to programmed heating above the glass transition temperature of the polymer but below its sticking temperature with removal of the volatile by-product. The polycondensation reaction proceeds strictly in the solid state under these conditions.

The SSP process is typically conducted in two stages. In the first stage, a low melt viscosity linear polycarbonate oligomer is synthesized by the melt phase reaction of a bisphenol with diaryl carbonate. Usually, a mixture of a dihydroxydiaryl compound and a diaryl carbonate is heated at 150° C. to 325° C. for 4 to 10 hours in presence of a transesterification catalyst to prepare an oligomer having weight average molecular weight of 2,000–10,000 daltons and having both hydroxyl and carbonate end groups. This oligomeric polycarbonate is referred to as the precursor or precursor polycarbonate. Thereafter, crystallization of the linear polycarbonate oligomer may be effected either by (a) dissolving the oligomer in a solvent and evaporating the solvent in presence of a suitable catalyst or (b) suspending the oligomer in diluent and refluxing it for 0 to 10 hrs in presence of a suitable catalyst followed by evaporating the diluent or (c) heating the oligomer at a temperature which is higher than the glass transition temperature of the oligomeric polycarbonate undergoing crystallization but below its melting point, in the presence of a suitable catalyst. It has been observed that diphenyl carbonate serves as a crystallization aid during thermal crystallization. Illustrative solvents and diluents include aliphatic aromatic hydrocarbons, ethers, esters, ketones, and halogenated aliphatic and aromatic hydrocarbons. The resulting oligomer has a crystallinity of between 5% and 55% as measured by a differential scanning calorimeter.

In a typical process, SSP, sometimes referred to as solid state polycondensation, is carried out by heating the crystallized oligomer along with a suitable catalyst. The reaction temperature and time may vary according to the type (chemical structure, molecular weight, etc.) of crystallized oligomer. However, it should be at least above the glass transition temperature and below the melting or sticking point of the oligomer. At this temperature the oligomer should not fuse during the solid state polycondensation. Since the melting point of the crystallized oligomer increases during the course of polycondensation, it is therefore desirable to increase the polycondensation temperature gradually. Generally the temperature should be 10–50° C. below the melting point of the oligomer and it should be in the range of 150–250° C. and more preferably between 180 and 220° C.

During the process of solid state polycondensation, the by-products (e.g. phenol, diphenyl carbonate, bisphenol) should be removed from the reaction system so as to allow the reaction to progress. For this purpose an inert gas is passed through the system which carries out the by-product. The inert gases which are generally used are $N_2$, He, Ar etc. and the flow rate of the carrier gas varies from 0.1 to 4 L/min depending upon the type of reactor and the particle size of the oligomer. The rate of polycondensation may depend on the type and the flow rate of the carrier gas.

Certain types of monomers are usually preferred for providing aliphatic ester units in polyestercarbonates prepared using the interfacial and melt preparation methods. One known method uses aliphatic alpha omega dicarboxylic acids that contain between 8 and 20 carbon atoms, and preferably about 9 or 10 carbon atoms, with saturated acids being preferred. Another method involves the utilization of aliphatic diacids that have between 4 and 8 carbon atoms. Diacids with 6 carbon atoms, such as adipic acid, are preferred. In addition, one method details the use of saturated aliphatic dibasic acids that are derived from straight chain paraffin hydrocarbons such as oxalic acid, malonic acid, dimethyl malonic acid, succinic acid, glutaric acid, adipic acid, pimelic acid, suberic acid, azelaic acid, and sebacic acid. It is stated that aliphatic carboxylic acids that contain heteroatoms in their aliphatic chain, such as diglycollic acid and thio-diglycollic acid, may also be employed. Two unsaturated acids which contain 4 carbon atoms, maleic acid and fumaric acid, are also mentioned.

SUMMARY OF INVENTION

The present invention utilizes solid state polymerization techniques to overcome the problems arising in the preparation of polyestercarbonates found in traditional interfacial or melt methods, and provides further surprising properties. These and further objects of the invention will be more readily appreciated when considering the following disclosure and appended claims.

In one aspect the present invention relates to a method for preparing a polycarbonate copolymer, prepared by solid state polymerization by preparing a mixture comprising partially crystalline bisphenol A polycarbonate oligomer and at least one source of additional structural units capable of forming ester linkages, and then subjecting the mixture to solid state polymerization to afford a polyestercarbonate. The present invention further employs a method of incorporating an aromatic triacid branching agent by SSP to produce branched polyestercarbonates.

DETAILED DESCRIPTION

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

As used herein the term "interfacial process" refers to a process comprising the simultaneous use of water and a water immiscible solvent.

The term "polyestercarbonate" as used herein refers to a polymer comprising both carbonate and ester linkages in the polymer chain.

As used herein the term "aromatic radical" refers to a radical having a valence of at least one comprising at least one aromatic group. Examples of aromatic radicals include phenyl, pyridyl, furanyl, thienyl, naphthyl, phenylene, biphenyl. The term includes groups containing both aromatic and aliphatic components, for example a benzyl group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "diacid soft block" refers to an aliphatic diacid which is not a "branched diacid." Examples of diacid soft blocks are dodecanedioic acid and sebacic acid.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclcopropyl, cyclopentyl cyclohexyl, tetrahydrofuranyl and the like.

As used herein the term "branched diacid" refers to diacids prepared by oxidative carbonylation of an olefin-containing monoacid. For example oxidative carbonylation of oleic acid gives a mixture of 9- and 10-carboxy stearic acid, said diacids being referred to as "branched diacids."

In one aspect, the present invention relates a method of incorporating into polycarbonate chains via SSP structural units derived from diacids, and their derivatives, having structure I

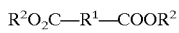

$$R^2O_2C-R^1-COOR^2 \quad\quad\quad I$$

wherein $R^1$ is a $C_4$–$C_{30}$ aromatic radical optionally substituted by one or more halogen atoms, $C_1$–$C_{10}$ alkyl radicals or $CO_2R_4$ groups; or a $C_1$–$C_{40}$ aliphatic radical, or a $C_5$–$C_{30}$ cycloaliphatic radical, and $R^2$ is a $C_4$–$C_{30}$ aromatic radical.

Structure I includes diacid soft blocks such as dodecanedioic acid, cis-octadec-9-enedioic acid and sebacic acid; aromatic diacid such as terephthalic acid, cycloaliphatic diacids such as 1,4-cyclohexanedicarboxylic acid; and branched diacids. Branched diacid blocks are incorporated into polycarbonates via SSP. Branched diacids that are suitable for incorporation under the conditions of the invention can readily be obtained from the catalytic carboxylation of unsaturated monoacids, such as oleic acid. For example, the known catalytic carboxylation of oleic acid affords a mixture of diacids bearing an octyl (9-carboxy stearic acid) or nonyl (10-carboxy stearic acid) group in the position adjacent to one of the carboxyl groups.

Structure I also includes ester derivatives which are found to be especially suited to copolymer formation with bisphenol A polycarbonate under SSP conditions. Phenyl esters are preferred.

Structure I further includes fully aromatic triacids and their ester derivatives. When an aromatic triacid or its ester derivative is reacted with polycarbonate under the conditions of the present invention a branched polyestercarbonate is obtained. This process yields effective branching in the product polyestercarbonate and potentially superior physical characteristics over previously disclosed branched polycarbonates.

In another aspect, the present invention relates a method of incorporating into polycarbonate chains via SSP structural units derived from hydroxy acids, and their ester derivatives, having structure II $$HO-R^3-COOR^4 \qquad \qquad II$$

wherein $R^3$ is a $C_4$–$C_{30}$ aromatic radical and $R^4$ is hydrogen or a $C_4$–$C_{30}$ aromatic radical.

The hydroxy acid II is preferably p-hydroxybenzoic acid or more preferably phenyl p-hydroxybenzoate which may be reacted with low molecular weight polycarbonate oligomers under SSP conditions to afford high molecular weight carbonate incorporating structural units derived from p-hydroxybenzoate.

The method of the present invention employ a catalyst and diphenyl carbonate in the production of polyestercarbonates that demonstrate advantageous properties relative to analogous simple polycarbonates.

The improved polyestercarbonates of the present invention employ bisphenol A polycarbonate as the polycarbonate source. Typically the polycarbonate is low molecular weight (weight average molecular weight $M_W$ of less than 10,000 daltons) oligomeric bisphenol A polycarbonate, referred to herein as "R-2" which is prepared by the melt reaction of bisphenol A with diphenyl carbonate in the presence of a catalyst such as sodium hydroxide at a temperature in a range between about 180° C. and about 350° C.

The present invention preferably employs $Sb_2O_3$ as a catalyst. The catalyst system performs two distinct and important functions. First, it serves as an effective nucleating agent for the crystallization of the starting molten blend of diacid, diphenyl carbonate, and amorphous polycarbonate. In this way, the catalyst affords a partially crystalline material which retains substantial crystalline and amorphous polycarbonate phases. In addition, in the amorphous regions of the material, the catalyst system effectively catalyzes the reaction of carbonate and acid groups to produce ester linkages and chain growth under SSP conditions. The catalyst and method of this invention are generally applicable to the preparation of numerous different types of polyestercarbonates that incorporate structural units derived from structures I or II.

The polyestercarbonate made by the method of the present invention generally has a weight average molecular weight ($M_W$) in a range between about 15,000 and about 40,000 daltons, and preferably in the range of about 15,000 to 30,000 daltons, and a glass transition temperature between 85° C. and 160° C., and preferably between 100° C. and 150° C.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C. $R_2$ oligomer refers to oligomeric bisphenol A polycarbonate having a weight average molecular weight of under 10,000 daltons.

Example 1

PHB (p-hydroxybenzoic acid) and phenyl p-hydroxybenzoate were incorporated into polycarbonate chains in separate procedures and the polyestercarbonate products were analyzed separately. In the first experiment, 22.86 grams of $R_2$ oligomer (0.09 moles), 1.38 grams of 4-hydroxybenzoic acid (0.01 moles), 4.28 grams of diphenyl carbonate (0.02 moles), and 2.8 milligrams of $Sb_2O_3$ were charged into a tubular glass reactor that was equipped for mechanical stirring. The mixture was heated at 210° C. for 30 minutes under a nitrogen atmosphere. Next, the molten polymer mixture was removed from the vessel, allowed to cool to room temperature, crushed to a fine particle size for SSP, and heated (while passing a stream of nitrogen gas through the particles) according to the following protocol:

Step 1: 150° C. for 2 hours
Step 2: 190° C. for 2 hours
Step 3: 210° C. for 2 hours
Step 4: 220° C. for 2 hours
Step 5: 240° C. for 2 hours The final polymer was then characterized by $^1$H-NMR, DSC, and GPC. Table 1 contains data for both an initial sample that was obtained prior to SSP and the product polyestercarbonate.

TABLE 1

| Sample | $T_g$ (° C.) | $T_m$ (° C.) | Weight-average molecular weight | Number-average molecular weight |
| --- | --- | --- | --- | --- |
| Initial polymer | 64 | 204 | 7,900 | 3,880 |
| Product polyestercarbonate | 147 | 287 | 25,800 | 10,350 |

$^1$H-NMR analysis indicated that 22% of the initial 4-hydroxybenzoic acid incorporated into the product polyestercarbonate.

In the second experiment, 22.86 grams of $R_2$ oligomer (0.09 moles), 2.14 grams of phenyl 4-hydroxybenzoate (0.01 moles), 1.07 grams of diphenyl carbonate (0.005 moles), and 2.5 milligrams of $Sb_2O_3$ were charged into a tubular glass reactor that was equipped for mechanical stirring. The mixture was heated at 210° C. for 30 minutes under a nitrogen atmosphere. Next, the molten polymer mixture was removed from the vessel, allowed to cool to room temperature, crushed to a fine particle size for SSP, and heated (while passing a stream of nitrogen gas through the particles) according to the following protocol:

Step 1: 150° C. for 2 hours
Step 2: 190° C. for 2 hours
Step 3: 210° C. for 2 hours
Step 4: 220° C. for 2 hours
Step 5: 230° C. for 2 hours
Step 6: 240° C. for 2 hours The final polymer was then characterized by $^1$H-NMR, DSC, and GPC. Table 2 contains data for both an initial sample that was obtained prior to SSP and the product polyestercarbonate.

TABLE 2

| Sample | $T_g$ (° C.) | $T_m$ (° C.) | Weight-average molecular weight | Number-average molecular weight |
| --- | --- | --- | --- | --- |
| Initial polymer | 73 | 206 | 6,200 | 3,080 |
| Product polyestercarbonate | 139 | 260 | 21,800 | 8,260 |

$^1$ H-NMR analysis indicated that 69% of the initial phenyl 4-hydroxybenzoate incorporated into the product polyestercarbonate.

Example 2

$R_2$ oligomer 3.12 grams of(cis) octadec-9-ene dioic acid (10 millimoles), 4.28 grams of diphenyl carbonate (20 millimoles), and 3 milligrams of $Sb_2O_3$ were combined in a glass reactor that was equipped for mechanical stirring. The mixture was heated at 150° C. for 1 hour and subsequently cooled. Next, 22.86 grams of ground $R_2$ oligomer (BPA polycarbonate oligomer) was added to the reactor. The mechanical stirring was activated and the mixture was heated to 210° C. for 45 minutes. The melt was then directly poured into cold water. The semi-crystalline intermediate was then isolated by filtration and characterized by DSC. The melting point was found to be 209° C., and ΔH was 17 J/g. The intermediate was then placed in a SSP reactor and heated under a stream of nitrogen according to the following protocol:

Step 1: 150° C. for 2 hours
Step 2: 190° C. for 2 hours
Step 3: 210° C. for 2 hours
Step 4: 220° C. for 2 hours
Step 5: 240° C. for 1 hour Samples of the reaction mixture were removed for characterization throughout the procedure. Complete incorporation of the diacid was observed after 6 hours. After 9 hours, the reaction vessel was allowed to cool, and the product polymer was removed with a spatula. The $^1$H-NMR (CDCl) analysis of this material indicated the presence of fully incorporated (cis) octadec-9-enedioic acid residues at a level corresponding to 60% of the total free diacid that was initially added.

Example 3

Branched diacids were reacted with $R_2$ polycarbonate oligomers under solid state polymerization conditions. This example, like the preceding one which incorporates diacid soft blocks into polycarbonates, also utilizes $Sb_3O_2$ as a catalyst in the production of high molecular weight polycarbonates incorporating branched diacids.

It was observed that, on a molar basis and a weight basis, branched diacids are significantly more effective than linear diacids at lowering the $T_g$ value of bisphenol-A polycarbonate (BPA). Table 3 contains this data.

TABLE 3

| Reaction Type | Diacid Type | Mole % Diacid in Product | Molecular Weight of Product | $T_g$ of Product (° C.) | $T_g$ of BPA – $T_g$ of Product | Effect at 1 mole % Diacid in Product |
|---|---|---|---|---|---|---|
| SSP | Linear $C_{18}$ | 6.0 | 43,000 | 134 | 15 | −2.5° C. |
| SSP | Branched $C_{19}$ | 8.2 | 27,000 | 111 | 38 | −4.6° C. |
| LF | Branched $C_{19}$ | 6.5 | 36,000 | 116.5 | 32.5 | −5.0° C. |

In other words, in order to reduce the $T_g$ of BPA by 25° C., 10 mole % of linear $C_{18}$ diacid would have to be added while only 5 mole % of branched $C_{19}$ diacid would be required.

Experimentally, 22.86 grams of $R_2$ oligomer (0.09 moles), 3.12 grams of a 1:1 mixture of 9-carboxystearic acid and 10-carboxystearic acid (0.01 moles), 4.28 grams of diphenyl carbonate (0.02 moles), and 3 milligrams of $Sb_2O_3$ (0.01 millimoles) were combined in a glass reactor. The mixture was heated at 210° C. for 15 minutes under a nitrogen atmosphere. Next, the molten mixture was removed from the vessel, allowed to cool, crushed to the desired particle size for SSP, and heated (while passing a stream of nitrogen gas through the particles) according to the following protocol:

Step 1: 150° C. for 2 hours
Step 2: 190° C. for 3 hours
Step 3: 210° C. for 2 hours
Step 4: 220° C. for 2 hours
Step 5: 230° C. for 2 hours
Step 6: 230° C. for 6 hours Samples of the reaction mixture were removed for characterization throughout the procedure. The collected data are presented in Table 4:

TABLE 4

| Step Number | Time (hours) | $T_g$ (° C.) | $T_m$ (° C.) | ΔH (J/g) | Molecular Weight |
|---|---|---|---|---|---|
| 0 | 0 | 51 | 204 | 24 | 8,550 |
| 1 | 2 | | | | |
| 2 | 3 | 73 | 220 | 35 | |
| 3 | 2 | 89 | 251 | 37 | |
| 4 | 2 | 93 | 272 | 40 | |
| 5 | 2 | 99 | 282 | 42 | |
| 6 | 6 | 111 | 288 | 43.5 | 26,900 |

The $^1$H-NMR analysis of the final polymer indicated a diacid residue presence of 8.2 mole % of residues derived from the branched diacid giving a yield of 82%.

Example 4

It has also been determined that pre-treatment of the polycarbonate precursor can yield improved results in the SSP process. In an exemplary synthesis of an initial polymer sample in this invention, 25.146 grams (0.099 moles) of $R_2$ oligomer, 0.438 grams (0.001 moles) of a trisphenyl ester of 1,3,5-benzenetricarboxylic acid, and 0.642 grams (0.003 moles) of diphenyl carbonate were mixed in a glass reactor equipped for mechanical stirring and heated at 210° C. for 20 minutes under a nitrogen atmosphere. The melt was then scooped from the reaction vessel with a spatula and allowed to cool to room temperature. This yielded a semi-crystalline mass which was then ground and placed on a No. 40 (0.0165 in.) sieve to remove particles having dimensions smaller than 0.0165 inches. (The "fines" produced in this process are fully recyclable and can be added to subsequent melt mixing stages and reused.) Next, the material with a particle size of greater than 0.0165 inches was characterized by DSC: $T_m$=219° C. and ΔH=16 J/g. It was subsequently placed in a SSP reactor and heated under a stream of nitrogen (2.5 L/min) according to the following protocol:

Step 1: 150° C. for 0.5 hours
Step 2: 190° C. for 2 hours
Step 3: 210° C. for 2 hours
Step 4: 220° C. for 2 hours
Step 5: 230° C. for 2 hours After 8.5 hours, the final polymer was removed from the reactor and characterized by GPC, DSC and $^1$H NMR.

DSC data: $T_g$=136° C., $T_m$=279° C.
GPC data: $M_w$=32,000, $M_n$=12,500
$^1$H NMR data: The $^1$H NMR (CDCl$_3$) of this material indicated the presence of fully incorporated branching agent residues at a level corresponding to 87% of the total initial branching agent The final polymer was subjected to a standard gel formation test and showed 0.4% gel formation, which indicates that an effective level of branching was present.

The invention has been described in detail with particular reference to preferred embodiments thereof, but it will be understood by those skilled in the art that variations and modifications can be effected within the spirit and scope of the invention.

What is claimed is:

1. A method for preparing a polycarbonate copolymer, prepared by solid state polymerization, said method comprising the steps of:
preparing a mixture comprising partially crystalline bisphenol A polycarbonate oligomer and at least one source of additional structural units, said units selected from the group consisting of: hydroxy acids, aliphatic diacids, cycloaliphatic diacids, aromatic diacids and aromatic triacids; and
subjecting said mixture to solid state polymerization to afford a polyestercarbonate copolymer.

2. A method according to claim 1, wherein said source of additional structural units is a diacid derivative having structure I

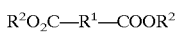   I wherein $R^1$ is a $C_4$–$C_{30}$ aromatic radical optionally substituted by one or more halogen atoms, $C_1$–$C_{10}$ alkyl radicals or $CO_2R^2$ groups; or a $C_1$–$C_{40}$ aliphatic radical, or a $C_5$–$C_{30}$ cycloaliphatic radical, and $R^2$ is a hydrogen atom or a $C_4$–$C_{30}$ aromatic radical.

3. A method according to claim 2, wherein said source of additional structural units is selected from the group consisting of 1,4-cyclohexanediacrboxylic acid, diphenyl cyclohexanedicarboxylate, dodecanedioic acid, diphenyl dodecanedioate, cis 9-octenedioic acid, diphenyl cis 9-octenedioate, alpha-nonyidecanedioic acid, diphenyl alpha-nonyidecanedioate, alpha-octylundecanedioic acid, and diphenyl alpha-octylundecanedioate, or mixtures thereof.

4. A method according to claim 2, wherein said source of additional structural units is selected from the group consisting of terephthaic acid, diphenyl terephthalate, 1,3,5-benzenetricarboxylic acid and triphenyl 1,3,5-benzenetricarboxylate.

5. A method according to claim 1, wherein said source of additional structural units is a hydroxy acid having structure II

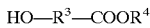   II wherein $R^3$ is a $C_4$–$C_{30}$ aromatic radical and $R^4$ is hydrogen or a $C_4$–$C_{30}$ aromatic radical.

6. A method according to claim 5, wherein said source of additional structural units is selected from the group consisting of 4-hydroxybenzoic acid and phenyl 4-hydroxybenzoate.

7. A method according to claim 1, wherein said mixture comprising partially crystalline bisphenol A polycarbonate oligomer and at least one source of additional structural units is prepared by exposure of a mixture comprising amorphous bisphenol A polycarbonate oligomer and at least one source of additional structural units to a mixture of methanol and dimethyl carbonate.

8. A method according to claim 1, wherein said mixture comprising partially crystalline bisphenol A polycarbonate oligomer and at least one source of additional structural units is prepared by heating a mixture comprising amorphous bisphenol A polycarbonate oligomer and at least one source of additional structural units in the melt at a temperature between about 190 and 250° C. in the presence of diphenyl carbonate.

9. A copolyestercarbonate prepared by a solid state polymerization method, said method comprising the steps of:
preparing a mixture comprising partially crystalline bisphenol A polycarbonate oligomer and at least one source of additional structural units, said units selected from the group consisting of: hydroxy acids, aliphatic diacids, cycloaliphatic diacids, aromatic diacids and aromatic triacids; and
subjecting said mixture to solid state polymerization to afford a polyestercarbonate copolymer.

10. A polyestercarbonate according to claim 9, wherein said source of additional structural units is a diacid derivative having structure I

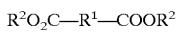   I wherein $R^1$ is a $C_4$–$C_{30}$ aromatic radical optionally substituted by one or more halogen atoms, $C_1$–$C_{10}$ alkyl radicals or $CO_2R^2$ groups; or a $C_1$–$C_{40}$ aliphatic radical, or a $C_5$–$C_{30}$ cycloaliphatic radical, and $R^2$ is hydrogen or a $C_4$–$C_{30}$ aromatic radical.

11. A polyestercarbonate according to claim 10, wherein said source of additional structural units is selected from the group consisting of 1,4-cyclohexanediacrboxylic acid, diphenyl cyclohexanedicarboxylate, dodecanedioic acid, diphenyl dodecanedioate, cis 9-octenedioic acid, diphenyl cis 9-octenedioate, alpha-nonyldecanedioic acid, diphenyl alpha-nonyldecanedioate, alpha-octylundecanedioic acid, and diphenyl alpha-octylundecanedioate, or mixtures thereof.

12. A polyestercarbonate according to claim 10, wherein said source of additional structural units is selected from the group consisting of terephthaic acid, diphenyl terephthalate, 1,3,5-benzenetricarboxylic acid and triphenyl 1,3,5-benzenetricarboxylate.

13. A polyestercarbonate according to claim 9, wherein said source of additional structural units is a hydroxy acid having structure II

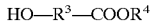   II wherein $R^3$ is a $C_4$–$C_{30}$ aromatic radical and $R^4$ is hydrogen or a $C_4$–$C_{30}$ aromatic radical.

14. A polestercarbonate according to claim 13, wherein said source of additional structural units is selected from the group consisting of 4-hydroxybenzoic acid and phenyl 4-hydroxybenzoate.

15. A polyestercarbonate according to claim 9, wherein said mixture comprising partially crystalline bisphenol A polycarbonate oligomer and at least one source of additional structural units is prepared by exposure of a mixture comprising amorphous bisphenol A polycarbonate oligomer and at least one source of additional structural units to a mixture of methanol and dimethyl carbonate.

16. A polyestercarbonate according to claim 9, wherein said mixture comprising partially crystalline bisphenol A polycarbonate oligomer and at least one source of additional structural units is prepared by heating a mixture comprising amorphous bisphenol A polycarbonate oligomer and at least one source of additional structural units in the melt at a temperature between about 190 and 250° C. in the presence of diphenyl carbonate.

* * * * *